(12) United States Patent
Lin (10) Patent No.: US 7,937,646 B2
(45) Date of Patent: May 3, 2011

(54) READING METHOD AND APPARATUS FOR AN INFORMATION RECORDING MEDIUM AND SPARE AREA ALLOCATION THEREOF

(75) Inventor: Wan-perng Lin, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 1220 days.

(21) Appl. No.: 11/554,483

(22) Filed: Oct. 30, 2006

(65) Prior Publication Data

US 2007/0101212 A1 May 3, 2007

Related U.S. Application Data

(60) Provisional application No. 60/732,731, filed on Nov. 2, 2005.

(51) Int. Cl.
*G11C 29/00* (2006.01)
(52) U.S. Cl. .............. 714/766; 369/47.14; 369/53.15; 369/275.3
(58) Field of Classification Search .............. 714/766; 369/47.14, 53.15, 275.3
See application file for complete search history.

(56) References Cited

U.S. PATENT DOCUMENTS

| | | | |
|---|---|---|---|
| 6,160,778 A | 12/2000 | Ito et al. | |
| 6,581,167 B1 | 6/2003 | Gotoh et al. | |
| 7,283,441 B2 * | 10/2007 | Motohashi | 369/47.14 |
| 7,330,407 B2 * | 2/2008 | Ko et al. | 369/47.14 |
| 7,372,793 B2 * | 5/2008 | Hwang et al. | 369/53.15 |
| 7,397,741 B2 | 7/2008 | Hwang et al. | |
| 7,639,582 B2 | 12/2009 | Hwang et al. | |
| 7,668,057 B2 | 2/2010 | Hwang et al. | |
| 2002/0145966 A1 * | 10/2002 | Hirotsune et al. | 369/275.3 |
| 2003/0191982 A1 | 10/2003 | Arakawa et al. | |
| 2004/0057357 A1 * | 3/2004 | Takahashi et al. | 369/47.14 |
| 2004/0090888 A1 * | 5/2004 | Park et al. | 369/47.14 |
| 2004/0264922 A1 * | 12/2004 | Gotoh et al. | 386/52 |

FOREIGN PATENT DOCUMENTS

| | | |
|---|---|---|
| CN | 1450548 A | 10/2003 |
| CN | 1472742 A | 2/2004 |
| EP | 1383128 A2 | 1/2004 |

* cited by examiner

*Primary Examiner* — Sam Rizk (57) ABSTRACT

An information recording medium reading method is provided. The information recording medium has a user data area for recording data and at Least one spare area for recording replacements for defects of the user data area. The method includes steps of sequentially reading the user data area upon a registered defect is read. searching a corresponding replacement for the registered defect in a cache buffer; reading the corresponding replacement and neighboring replacements thereof from the spare area if the corresponding replacement is failed to be found in the searching step; storing the read replacements in the cache buffer; and repeating the above steps until a reading procedure is completed. A reading apparatus, which includes the cache buffer for storing the replacements and implements the above method, is also provided.

20 Claims, 10 Drawing Sheets

READING METHOD AND APPARATUS FOR AN INFORMATION RECORDING MEDIUM AND SPARE AREA ALLOCATION THEREOF

CROSS REFERENCE TO RELATED APPLICATIONS

This application claims priority to U.S. Provisional Patent Application Ser. No. 60/732731 filed on Nov. 2, 2005 and entitled "Reading method and apparatus for an information recording medium and spare area allocation thereof".

TECHNICAL FIELD OF THE INVENTION

The present application relates to a reading method and apparatus for an information recording medium and spare area allocation thereof, more particularly, to a method and apparatus for reading replacements recorded in a spare area of the disc, as well as a method for allocating the replacements in the spare area.

BACKGROUND OF THE INVENTION

An information recording medium such as a video recording disc (e.g. DVDRAM) has spare areas. The spare areas are located at inner side and outer side of the innermost and outermost of a user data area of the disc, respectively.

Figure 1:
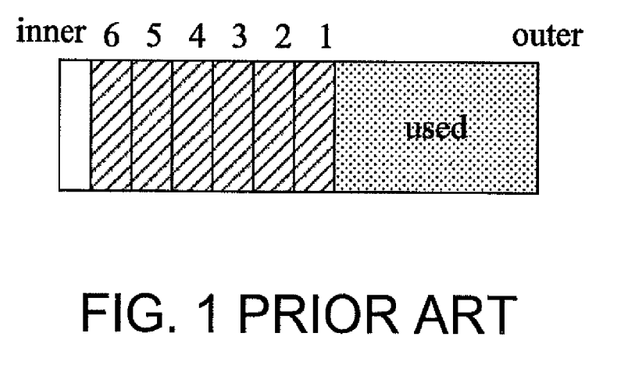
FIG. 1 schematically illustrates allocation of replacements in prior art.

For recording information on the disc, verification is performed after each writing procedure to check if there are defects in the user data area that records user data. A defect usually indicates a defective ECC block, which contains 16 sectors. If there are defects, replacements corresponding to the defects are stored into the spare area to be used as back-up blocks. Each of the spare areas is sequentially occupied and used from the outermost toward the innermost. In a case that six defects are found in the user data area, as shown in FIG. 1, corresponding replacements for the six defects are recorded in the spare area in a manner that the replacement for the first defect is recorded at the outermost location of the unused region of the spare area. The replacement for the second defect is inwardly recorded beside the first replacement, that is, the outermost location of the unused region, of which the area has been reduced due to the occupation by the first replacement. The rest can be deduced similarly.

The defect having the corresponding replacement thereof recorded is referred to a registered defect. The relationship information between the registered defects and the corresponding replacements, such as addresses, are recorded in a certain region of the disc, as commonly known in this field.

Figure 2:
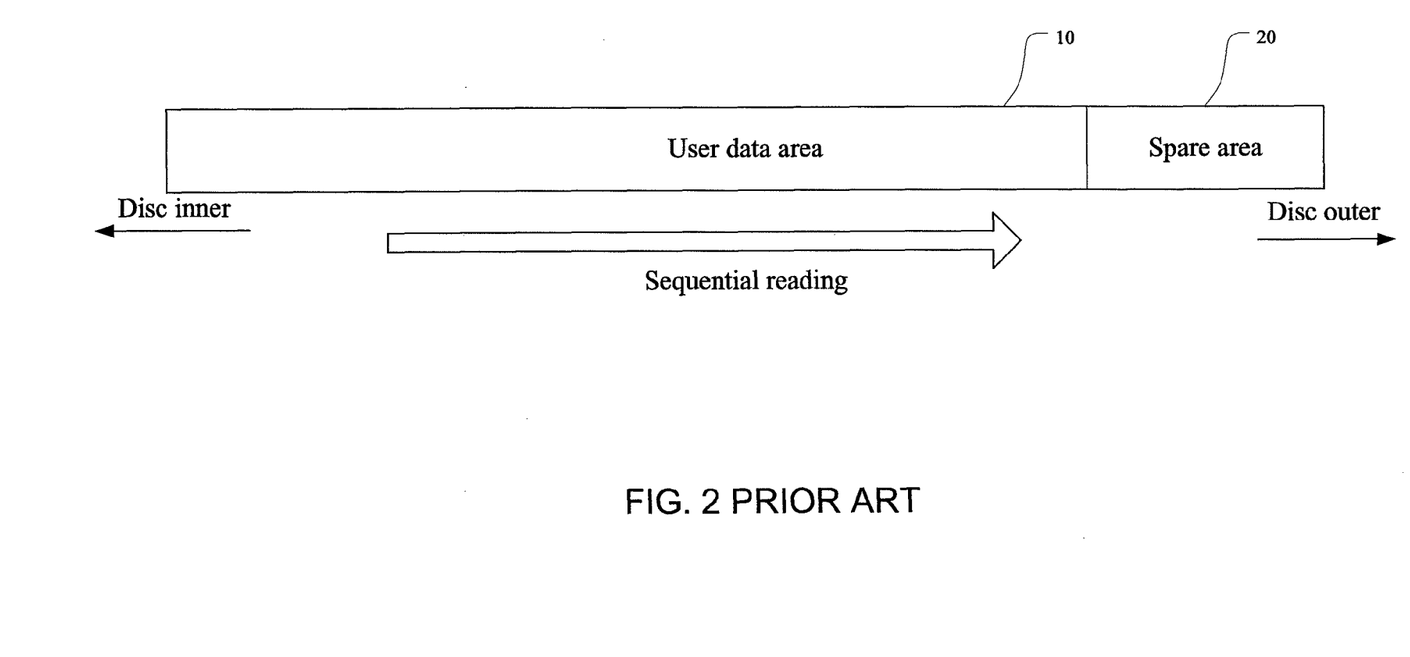
FIG. 2 schematically illustrates arrangement of a user data area and spare area of a disc.

In a sequential reading procedure, a pick-up head of a reading apparatus reads the user data area 10 substantially from the innermost toward the outermost, as shown in FIG. 2. In FIG. 2 and other drawings, only the outer side spare area 20 is shown as an example for the sake of simplicity.

Figure 3:
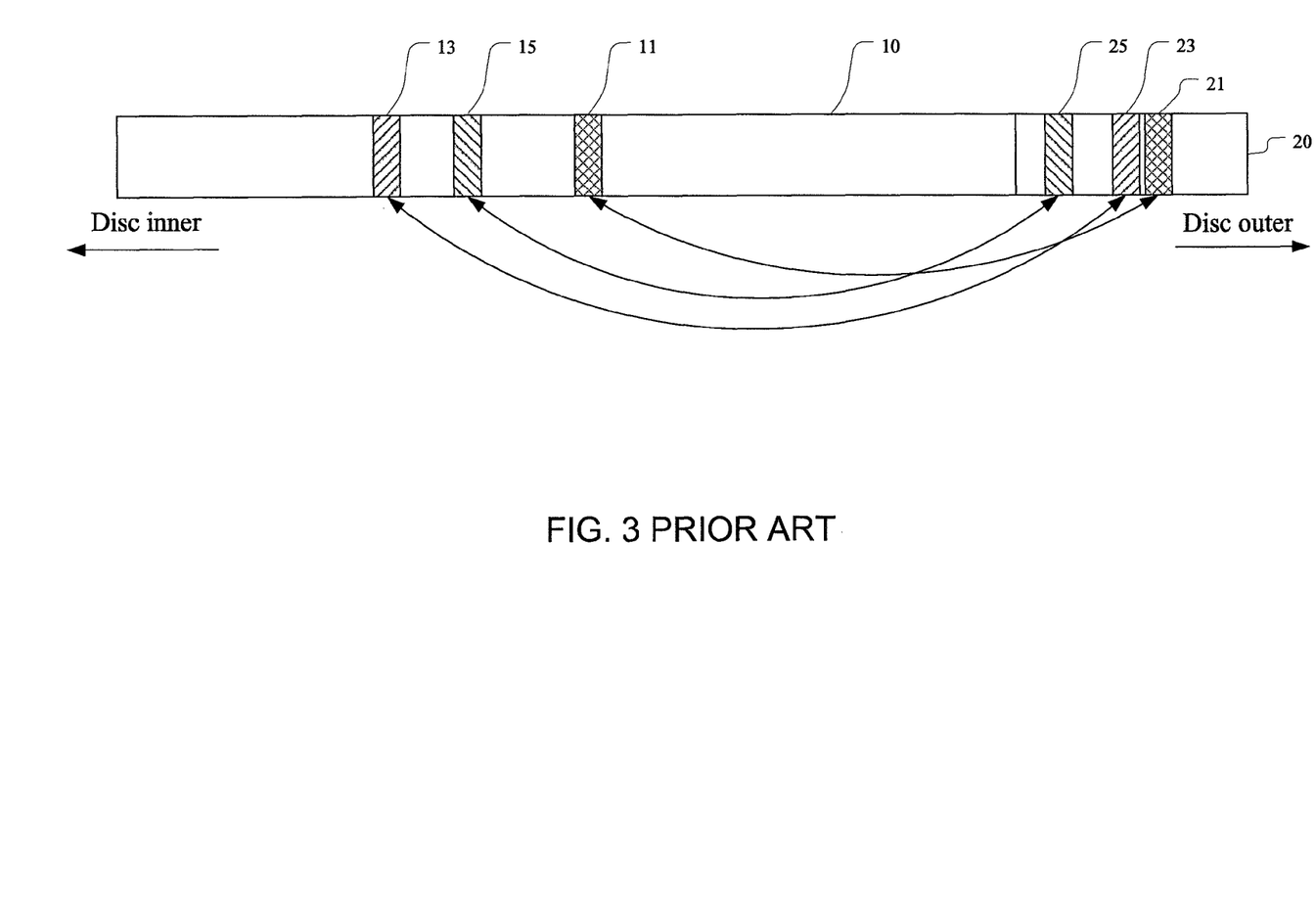
FIG. 3 schematically illustrates correspondence between registered defects in the user data area and corresponding replacements in the spare area of the disc of FIG. 2.

FIG. 3 illustrates the user data area 10 having defects 11, 13, and 15. As shown, the corresponding replacements 21, 23, and 25 are recorded in the spare area 20. In this example, the defect 11 is found in a fore writing/verifying process, so the corresponding replacement 21 thereof is recorded at the outermost among the three replacements. The defects 13 and 15 are found sequentially in one or respective writing/verifying processes later. Accordingly, the corresponding replacements 23 and 25 are arranged inwardly at the inner side of the replacement 21.

Figure 4:
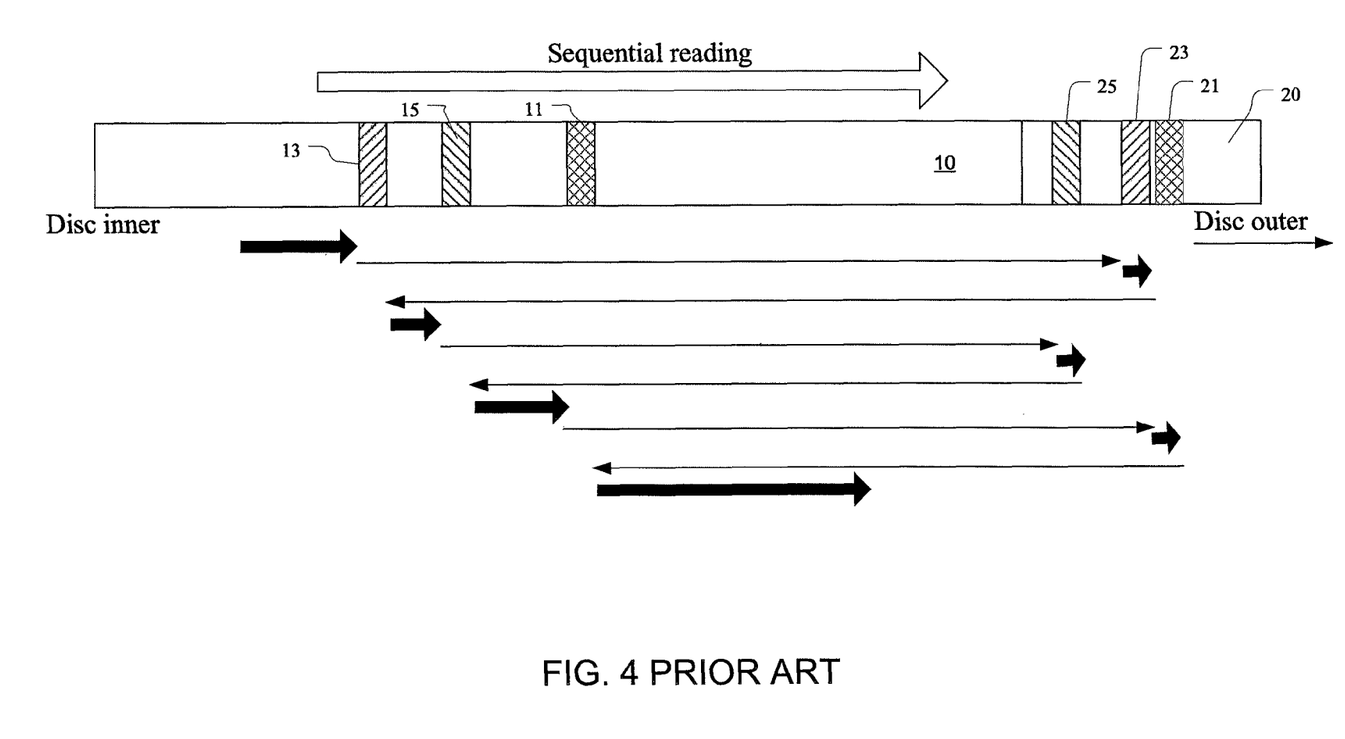
FIG. 4 schematically illustrates a conventional reading procedure.

FIG. 4 schematically illustrates a conventional reading procedure. In this drawing, the bold arrows indicate reading operations of the pick-up head and the normal arrows indicate seeking operations of the pick-up head. The pick-up head sequentially reads data in the user data area 10. When the defect 13 is read, the pick-up head shifts to the spare area 20 to read the corresponding replacement 23, and then returns to the user data area 10 to read the data following the defect 13 until the next defect 15 is read. The pick-up head then jumps to the spare area 20 to read the corresponding replacement 25 to supplement the data for the defect 15. After reading the replacement 25, the pick-up head again returns to the user data area 10 to read the data following the defect 15 until the next defect 11 is read. The pick-up head once more jumps to the spare area 20 to read the replacement 21 corresponding to the defect 11 to supplement the data for the defect 11. Then the pick-up head returns to the user data area 10 to read the rest of the data. As described above, to obtain a complete data sequence in the sequential reading procedure, the pick-up head needs to shift back and forth between the user data area 10 and the spare area 20 for many times, as shown in FIG. 4.

Such frequent movements of the pick-up head for obtain corresponding replacements to replace the different defects of the user data area 10 may increase the load of the reading apparatus and degrades the stability thereof. Thus, the present invention brings a solution to the foregoing problem.

SUMMERY OF THE INVENTION

An objective of the present invention is to provide a method for reading an information recording medium. The information recording medium has a user data area and at least one spare area. Corresponding replacements for defects of the user data area are recorded in the spare area to be used as backup sectors. Utilizing the reading method in accordance with the present invention, the frequency that a pick-up head of a reading apparatus moves back and forth between the user data area and the spare area in a sequential reading procedure can be reduced.

Another objective of the present invention is to provide an apparatus for reading an information recording medium. The information recording medium has a user data area and at least one spare area. Corresponding replacements for defects of the user data area are recorded in the spare area to be used as backup. Compared to a conventional reading apparatus, the frequency of a pick-up head of the reading apparatus according to the present invention to go and return between the user data area and the spare area in a sequential reading procedure is reduced.

A further objective of the present invention is to provide a modified allocation method for replacements in the spare area. The disposition of the replacements provided by this allocation method is more preferably accommodated with the reading method of the present invention.

In accordance with still a further aspect of the present invention, the method for allocating replacements in an information recording medium, which has a user data area for recording data and a spare area for recording replacements corresponding to defects of the user data area, includes steps of: verifying a section of the user data area after writing said section to sequentially find defects in the section; recording corresponding replacements for the defects in the spare area, wherein the corresponding replacements for the last one to the first one of the defects are sequentially disposed inward from the outmost location of an unused portion of the spare area.

BRIEF DESCRIPTION OF THE DRAWINGS

The present invention will be further described in detail in conjunction with the accompanying drawings, wherein.

DETAILED DESCRIPTION OF THE INVENTION

Figure 5:
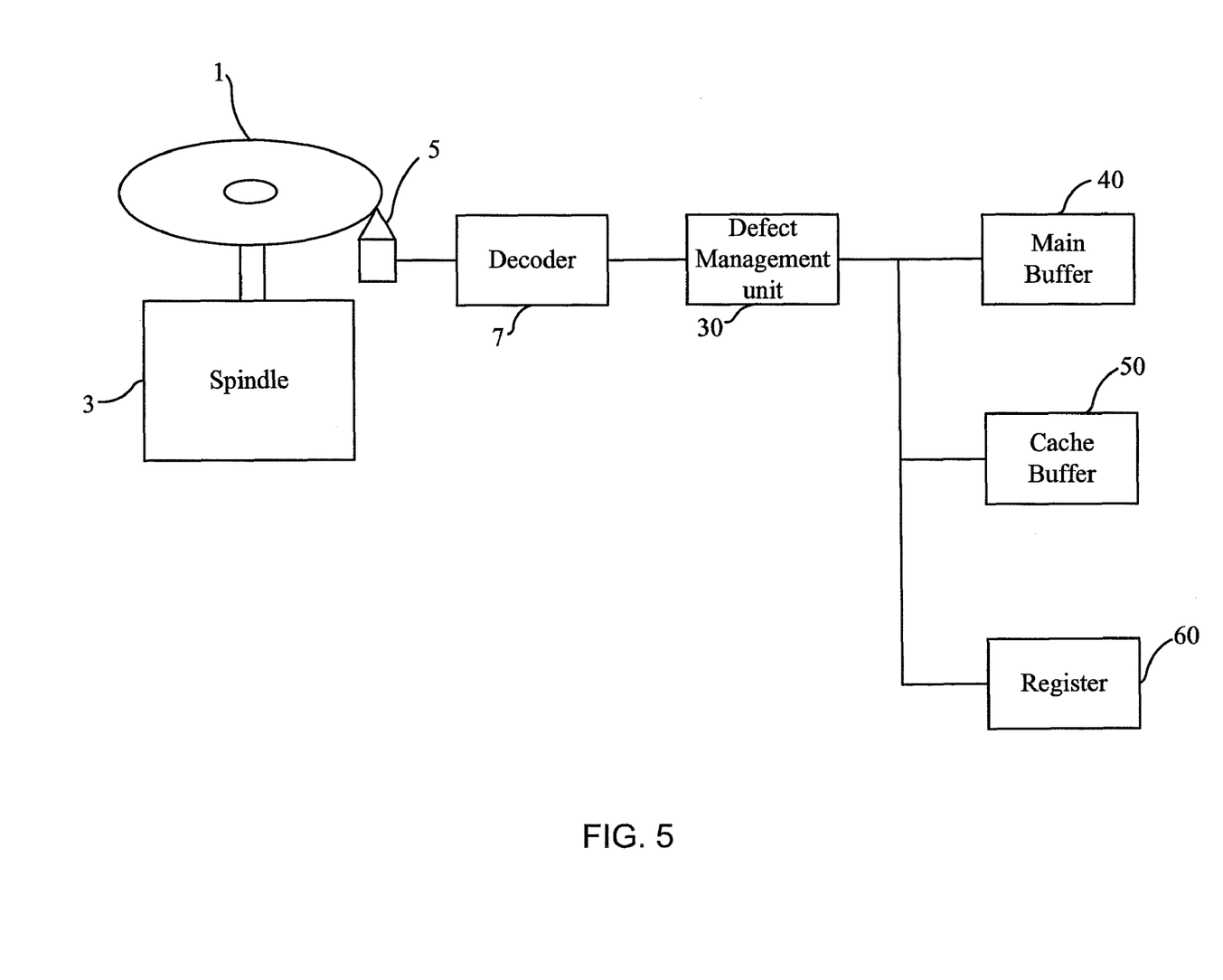
FIG. 5 schematically illustrates relevant components of a reading apparatus in accordance with the present invention.
Figure 6:
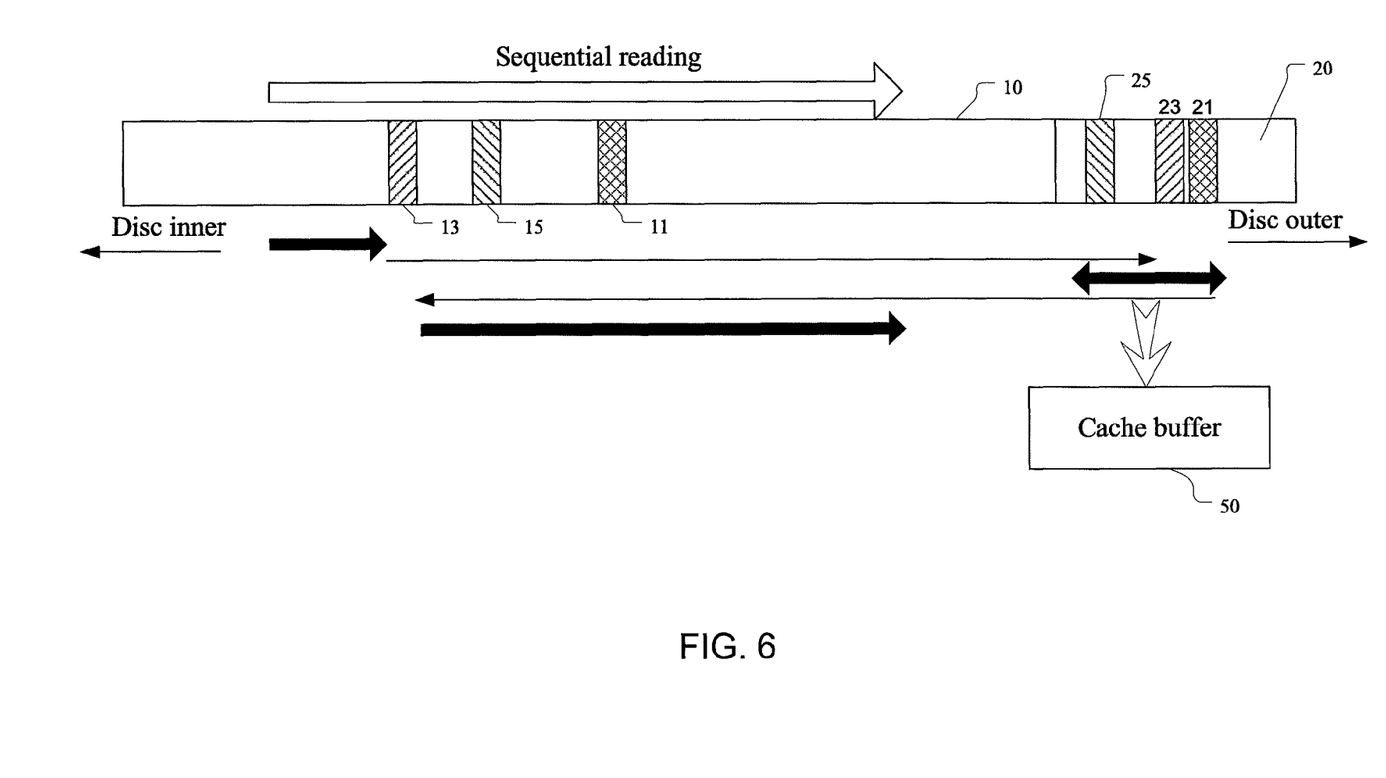
FIGS. 6 and 7 schematically illustrate a reading procedure in accordance with the present invention.
Figure 7:
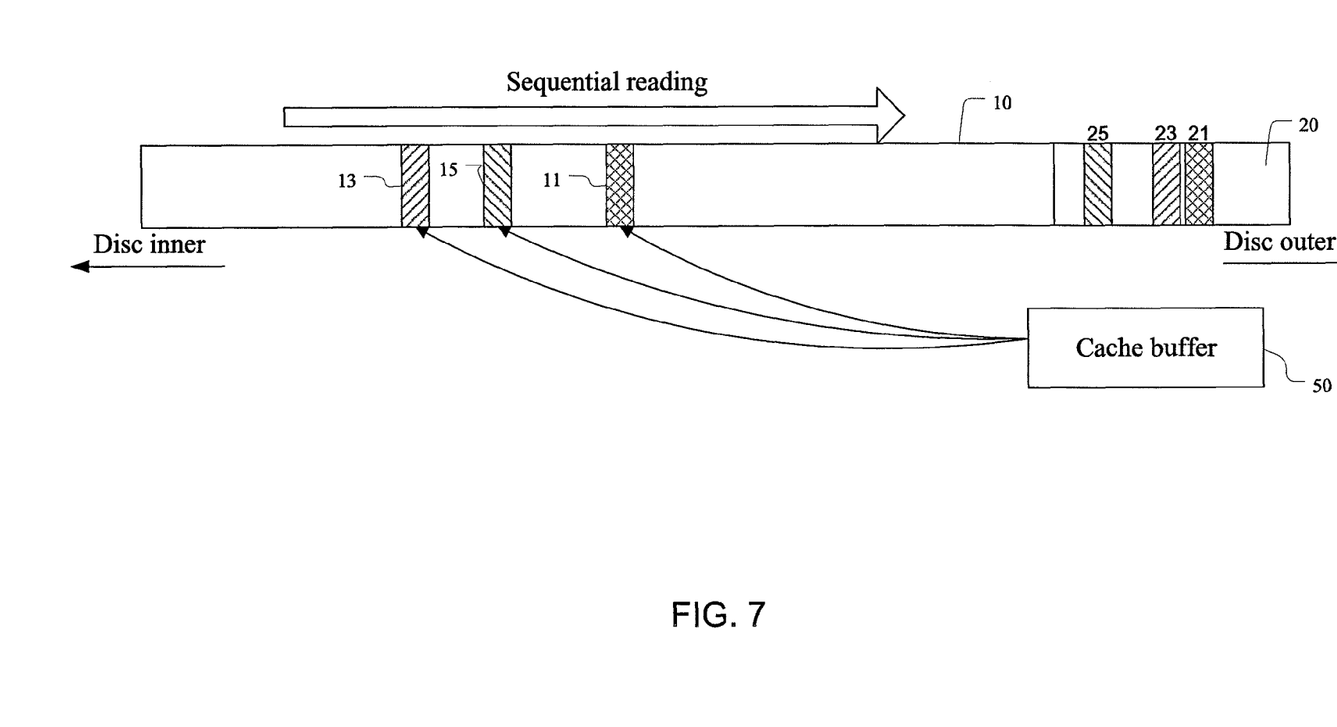

The present invention will be described in detail as follows. FIG. 5 roughly shows essential components of a reading apparatus in accordance with the present invention, and FIGS. 6 and 7 illustrate an information recording medium reading method in accordance with the present invention. As in FIG. 4, the bold arrows indicate reading operations of the pick-up head and the normal arrows indicate the seeking operations of the pick-up head in FIG. 6.

With reference to FIG. 5, the reading apparatus according to the present invention includes a pick-up head 5 to read an information recording medium, such as a DVDRAM disc 1, which is rotated by a spindle 3, a decoder 7 for decoding data read from the disc 1, a replacement controller 30, a main buffer 40, a cache buffer 50 and a register 60. The details will be further described later.

Figure 8:
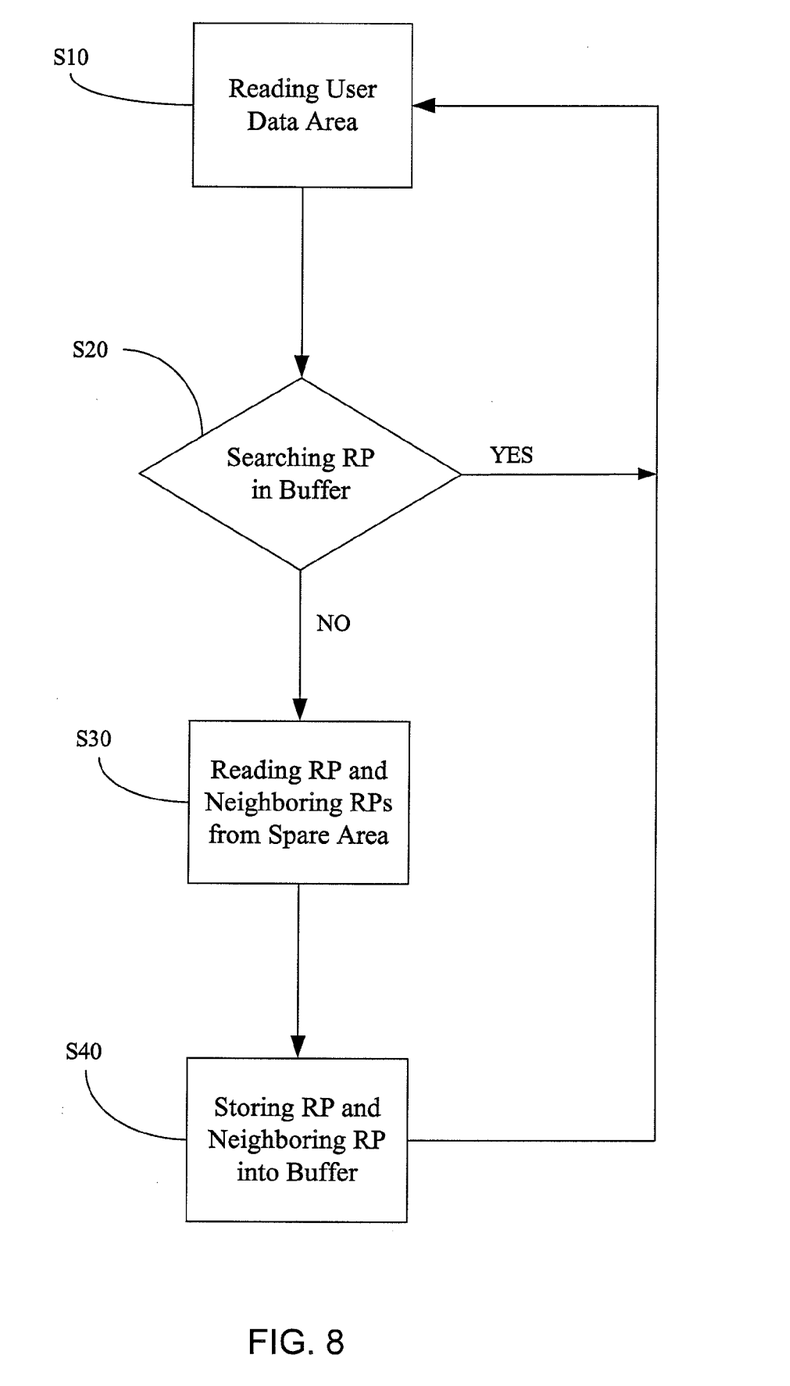
FIG. 8 is a flow chart generally showing the reading method in accordance with an embodiment of the present invention.

FIG. 8 simply shows a flow chart of a reading method in accordance with an embodiment of the present invention. With reference to FIGS. 5, 6 and 7 as well as FIG. 8, a sequential reading procedure in accordance with the present invention for the disc 1 is performed. As mentioned above, the disc 1 has the user data area 10 and the spare area 20. As above, the outer spare area is described as an example for the sake of simplicity. The corresponding replacements 21, 23 and 25 for the registered defects 11, 13 and 15 in the user data area 10 are recorded in the spare area 20 as previously described. The pick-up head (PUH) 5 of the reading apparatus in accordance with the present invention reads the user data area 10 sequentially in a sequential reading procedure (Step S10 in FIG. 8). When the PUH 5 reads the first registered defect 13, the replacement controller 30 conducts a search in the cache buffer 50 to find the corresponding replacement 23 thereof (Step S20 in FIG. 8). If the corresponding replacement 23 is not found in the cache buffer 50, the PUH 5 moves to the spare area 20 to read the corresponding replacement 23, and also read the neighboring replacements thereof (Step S30 in FIG. 8), ideally including replacements 21 and 25 in this embodiment. In another embodiment, only the neighboring replacement(s) after the corresponding replacement 23, the replacement 21 in this case, is read with the replacement 23.

The range of the neighboring replacements being buffered in the cache buffer 50 can be determined according to a predetermined algorithm built in the reading apparatus. Alternatively, the range can be dynamically determined according to at least one of the parameters such as location relationship between the registered defect and the corresponding replacement, performance of the reading apparatus, reading mode, and condition of the disc 1. The range can also be determined by the built-in algorithm and dynamically adjusted according to the parameters mentioned above.

The achievability for reading the neighboring replacements can be less critical than that for reading the corresponding replacement. For example, it can be set that the reading apparatus attempts to read the corresponding replacement for six times at most, while the reading apparatus abandons to read the neighboring replacements thereof within a pre-defined range after three failed attempts. The respective times that the reading apparatus attempts to read the corresponding replacement and the neighboring replacements mentioned herein are only for explication. In practice, the number of times can be determined as desired.

The read replacements are stored in the cache buffer 50 (Step S40 in FIG. 8), and the data read from the user data area 10 is stored in the main buffer 40. The corresponding replacement 23 is used to supplement the data for the registered defect 13. The PUH 5 then subsequently reads the following data in the user data area 10. When the PUH 5 meets the next defect 15, the replacement controller 30 conducts another search in the cache buffer 50 and picks up the corresponding replacement 25 from the cache buffer 50. If it fails to pick up the corresponding replacement 25 from the cache buffer 50, the replacement controller 30 may permit of a predetermined times of attempts. If the corresponding replacement 25 is still failed to be picked up from the cache buffer 50 after the predetermined times of attempts, the replacement controller 30 determines to abandon this pick up operation.

Since the capacity of the cache buffer 50 is limited, it is preferred that the replacements stored therein are all cleared if it is failed to find the corresponding replacement therefrom for a registered defect. However, if the capacity of the cache buffer 50 is large enough, it is also acceptable that only a portion of the replacements stored therein are cleared when the corresponding replacement for a registered defect is failed to be found in the cache buffer 50. To partially clear the replacements in the cache buffer 50, various manners can be performed in practice. For example, the replacement first stored in the cache buffer 50 is cleared first.

The registered defect 11 and the corresponding replacement 21 thereof are similarly dealt with as above. In the preferred embodiment, the corresponding replacement 21 for the registered defect 11 has been read and stored in the cache buffer 50 as well as the neighboring replacements when the corresponding replacement 23 for the defect 13 is read. Accordingly, the replacement controller 30 can find the corresponding replacement 21 from the cache buffer 50 for the registered defect 11. Thus, the PUH 5 does not need to jump to the spare area 20 to read the corresponding replacement 21. By the reading method in accordance with the present invention, the frequency that the pick-up head moves back and forth between the user data area and the spare area is significantly decreased.

In this embodiment, whenever a registered defect is found, the reading apparatus searches the corresponding replacement thereof from the cache buffer 50. If the corresponding replacement is failed to be found in the cache buffer 50, the apparatus reads the corresponding replacement and the neighboring replacements from the spare area and stores these replacements in the cache buffer 50. However, the steps such as searching, reading and storing of the replacements can be executed periodically or executed for a group of registered defects.

Figure 9:
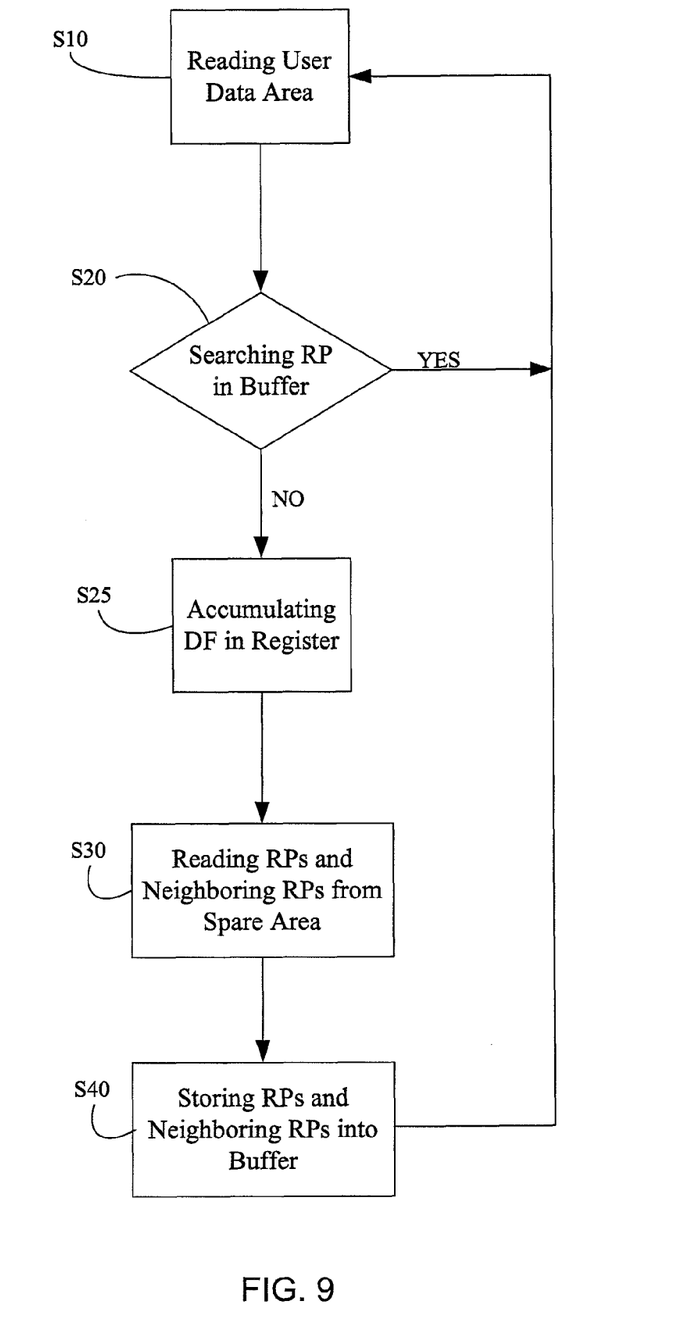
FIG. 9 is a flow chart generally showing the reading method in accordance with another embodiment of the present invention, the same step numbers in this drawing indicate the same steps as in FIG. 8.

In another embodiment, of which the flow chart is simply and generally shown in FIG. 9, the reading apparatus in accordance with the present invention does not immediately read a corresponding replacement from the spare area for a defect when the corresponding replacement is failed to be found in the cache buffer 50. Substitutively, the apparatus stores the defect in the register 60 (Step S25 in FIG. 9). Whenever the reading procedure has been performed for a predetermined period of time, the replacement controller 30 drives the PUH 5 to read the corresponding replacements and the neighboring replacements thereof from the spare area 20 for the defects stored in the register 60. Alternatively, the replacement controller 30 executes these steps whenever the number of defects accumulated in the register 60 achieves a predetermined amount, for example, whenever the register 60 is full.

According to the present invention, the PUH 5 reads the data recorded in the user data area 10 and stored the same in the main buffer 40, and picks up the replacements from the spare area 20 for the registered defects in the user data area 10 as well as the neighboring replacements thereof, and stores those replacements in the cache buffer 50. The data recorded in portions of the user data area 10 between the defects, which are stored in the main buffer 40, and the corresponding replacements for the defects of the user data area 10, which are stored in the cache buffer 50, are alternately transmitted so as to form a complete data sequence. Alternatively, the corresponding replacements stored in the cache buffer 50 can be copied to the main buffer 40 to supplement the data for the register defects so that the replacements are combined with the data recorded in the user data area 10 to form a complete data sequence in the main buffer 40, then the complete data sequence is transmitted from the main buffer 40.

In accordance with the present invention, the method related to utilization of the cache buffer 50 can be suspended as desired. For example, when a random reading mode (to read the information fragments distributed randomly on the disc) is executed, saving the replacements in the cache buffer 50 is of little or even no benefit, because the probability that the replacements stored in the cache buffer 50 are able to be used is very low. Accordingly, the reading apparatus can be switched to a normal reading mode, that is, the conventional reading manner. However, the reading apparatus can still store the read defects in the register 60, and catch the corresponding replacements for those defects stored in the register 60 at a time either periodically or whenever the number of the defects stored in the register 60 reaches a predetermined value. It is noted that the main buffer 40, cache buffer 50 and register 60 can be implemented by any proper types of storage devices.

To be more ideally accommodated with the reading method in accordance with the present invention, the method for allocating the corresponding replacements in the spare area for the registered defects of the user data area is preferably modified. The details will be further described as follows.

Figure 10:
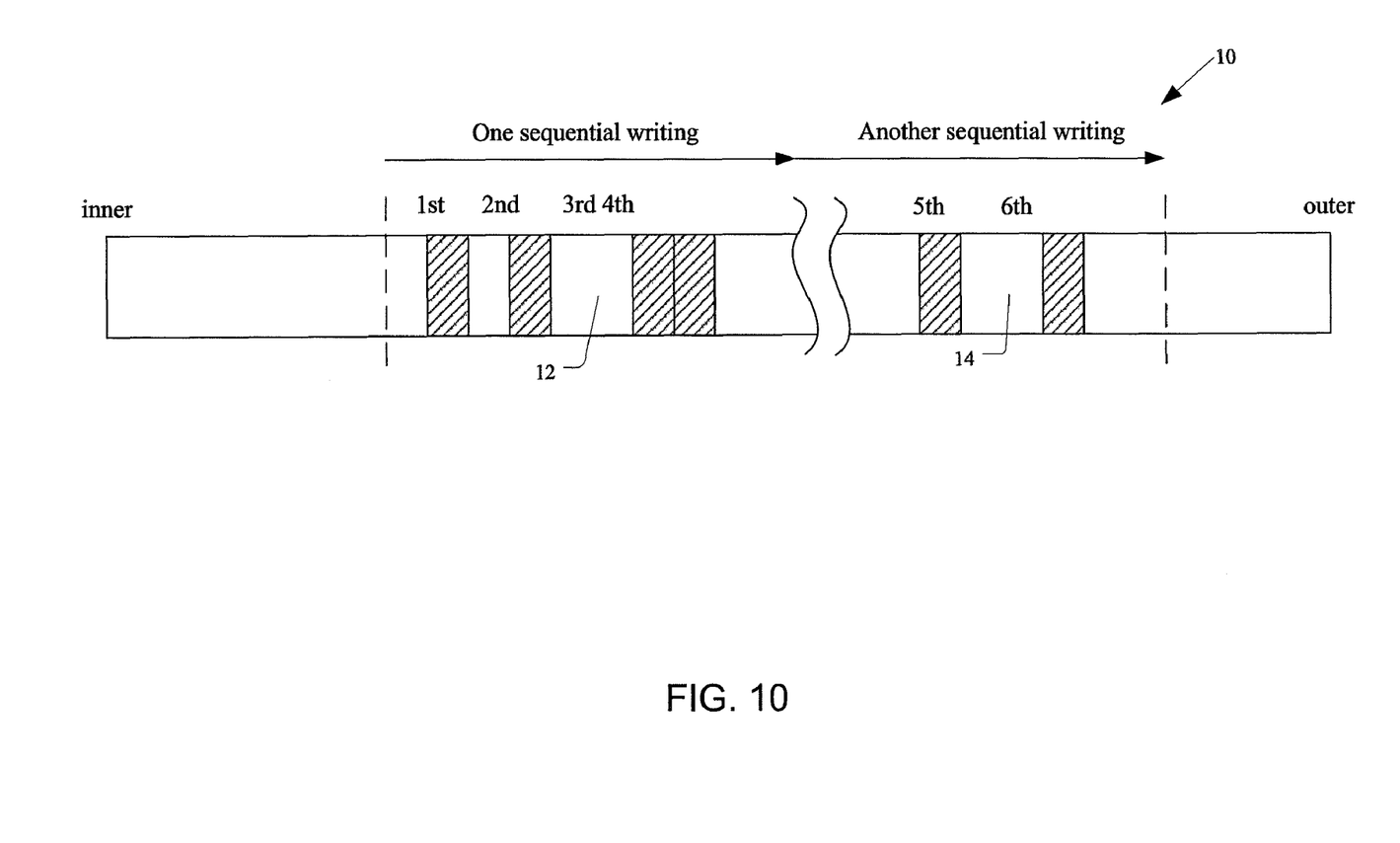
FIG. 10 generally and schematically shows distribution of defects in a user data area of a disc.

With reference to FIG. 10, in this example, the user data area 10 of the disc 1 suffers two sequential writing procedures, in each of which a section of the user data area is written. Verification is performed after each writing procedure. In verification for the first writing procedure, four defects (the first, second, third and fourth defects) are found. In verification for the second writing procedure, two defects (the fifth and sixth defects) are found. It is noted that two sections 12, 14 written in these two writing procedures may be disposed sequentially or randomly. Also, these sections 12, 14 may be disposed continuously or discretely. The sections 12, 14 may even overlap with each other.

As previously described, conventionally, each of spare areas is sequentially occupied and used from the outmost toward the inner side. As illustrated in FIG. 1, the replacements corresponding to the first to sixth defects are disposed from the outermost location toward the inner side of the unused region of the spare area.

Figure 11:
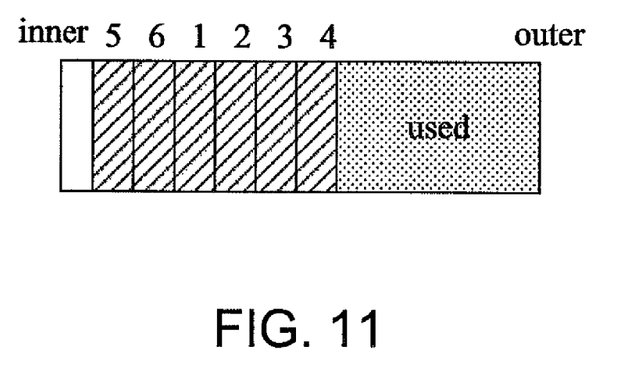
FIG. 11 schematically illustrates allocation of replacements in accordance with the present invention.

According to the present invention, the corresponding replacements for the defects of the first writing procedure, that is, the first to fourth defects, are recorded in the unused region of the spare area in a manner that the four corresponding replacements are inwardly disposed at the outermost location of the unused region of the spare area with a sequence from the last one (the replacement corresponding to the fourth defect) to the first one (the replacement corresponding to the first defect), as shown in FIG. 11.

The corresponding replacements for the defects of the second writing procedure, that is, the fifth and sixth defects, are recorded at the outermost location of the unused region of the spare area, of which the area has been reduced due to the occupation of the previous four replacements, in the similar manner as above.

Although the disc suffering two sequential writing procedures (the user data area of the disc having two sections) is described above as an example, the case that the disc suffers more sequential writing procedures can be deduced similarly.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. An information recording medium reading method, said information recording medium having a user data area for recording data and a spare area for recording replacements corresponding to registered defects of the user data area, said method comprising steps of:

sequentially reading the user data area;

searching a corresponding replacement for the registered defect in a storage device upon a registered defect is read;

reading the corresponding replacement and neighboring replacements thereof from the spare area if the corresponding replacement is failed to be found in the storage device;

storing the read replacements in the storage device; and repeating the above steps until a reading procedure is completed.

2. The method as claimed in claim 1, further comprising:

clearing at least a portion of replacements stored in the storage device if the corresponding replacement for the defect is failed to be found in the storage device.

3. The method as claimed in claim 1, wherein a range of the neighboring replacements is predetermined.

4. The method as claimed in claim 1, wherein a range of the neighboring replacements is determined according to at least one of the parameters selected from a group consisting essentially of location relationship between the defect and the corresponding replacement, performance of a reading apparatus performing the reading operation, reading mode, and condition of the information recording medium.

5. The method as claimed in claim 1 further comprising:
   accumulating registered defects found in the user data area; and
   searching the corresponding replacements recorded in the spare area for the accumulated registered defects.

6. The method as claimed in claim 5, wherein the searching step is executed whenever the number of the accumulated registered defects reaches a predetermined value.

7. The method as claimed in claim 5, wherein the accumulating and searching steps are executed periodically.

8. A reading apparatus for reading an information recording medium having a user data area for recording data and a spare area for recording replacements corresponding to registered defects of the user data area, said apparatus comprising:
   a pick-up head for reading data;
   a first storage device for storing the data read from the user data area by the pick-up head;
   a second storage device for storing replacements; and
   a replacement controller for searching a corresponding replacement in the second storage device when a registered defect is found in the user data area, while driving the pick-up head to read the corresponding replacement and neighboring replacements thereof from the spare area of the information recording medium and storing the read replacements into the second storage device when the corresponding replacement is failed to be found in the second storage device.

9. The apparatus as claimed in claim 8, wherein at least a portion of the replacements stored in the second storage device are cleared if the corresponding replacement for the defect is failed to be found in the second storage device.

10. The apparatus as claimed in claim 8, wherein the replacement controller determines a range of the neighboring replacements based on a built-in predetermined algorithm.

11. The apparatus as claimed in claim 8, wherein the replacement controller determines a range of the neighboring replacements according to at least one of the parameters selected from a group consisting essentially of location relationship between the defect and the corresponding replacement, performance of the reading apparatus, reading mode, and condition of the information recording medium.

12. The apparatus as claimed in claim 8, wherein the replacement controller accumulates registered defects found in the user data area; and searches the corresponding replacements recorded in the spare area for the accumulated registered defects.

13. The apparatus as claimed in claim 12, wherein the replacement controller searches the replacements whenever the number of the accumulated registered defects reaches a predetermined value.

14. A method for allocating replacements in an information recording medium, said information recording medium having a user data area for recording data and a spare area for recording replacements corresponding to defects of the user data area, said method comprising steps of:
   verifying a section of the user data area after writing data to said section to sequentially find defects in the section; and
   recording corresponding replacements for said defects in the spare area, wherein the corresponding replacements for the last one to the first one of the defects are disposed inward from the outmost location of an unused portion of the spare area.

15. The method as claimed in claim 14 wherein the user data area has a plurality of sections, and all of the steps are repeated for each of the sections.

16. The method as claimed in claim 15, wherein the sections are respectively written in respective writing procedures.

17. The method as claimed in claim 15, wherein the sections are sequentially disposed in the user data area.

18. The method as claimed in claim 15, wherein the sections are randomly disposed in the user data area.

19. The method as claimed in claim 15, wherein the sections are continuously disposed in the user data area.

20. The method as claimed in claim 15, wherein the sections are discretely disposed in the user data area.

* * * * *